United States Patent [19]

DiStefano

[11] Patent Number: 5,252,622
[45] Date of Patent: * Oct. 12, 1993

[54] CELLULAR CONTACT ADHESIVE FILMS HAVING IMPROVED BOND STRENGTH

[75] Inventor: Frank V. DiStefano, Macungie, Pa.

[73] Assignee: Air Products and Chemicals, Inc., Allentown, Pa.

[*] Notice: The portion of the term of this patent subsequent to Oct. 2, 2007 has been disclaimed.

[21] Appl. No.: 791,756

[22] Filed: Nov. 12, 1991

Related U.S. Application Data

[63] Continuation of Ser. No. 490,171, Mar. 8, 1990, Pat. No. 4,960,802.

[51] Int. Cl.$^5$ .................................................. C08J 9/30
[52] U.S. Cl. ........................................ 521/65; 521/71; 521/72; 521/142; 521/146; 521/149; 521/150; 524/556; 524/559; 524/560; 524/571
[58] Field of Search ................... 521/65, 146, 71, 142, 521/72, 150, 91, 149; 524/556, 559, 560, 571

[56] References Cited

U.S. PATENT DOCUMENTS

| | | | |
|---|---|---|---|
| 3,151,427 | 10/1964 | Meissner et al. | 521/65 |
| 3,565,247 | 2/1971 | Brochman | 206/59 |
| 3,933,691 | 1/1976 | Lindemann | 521/65 |
| 4,251,584 | 2/1981 | van Engelen et al. | 521/149 |
| 4,415,615 | 11/1983 | Esmay et al. | 428/40 |
| 4,561,918 | 12/1985 | Scharfenberg et al. | 156/78 |
| 4,696,951 | 9/1987 | Lunsford et al. | 521/65 |
| 4,713,263 | 12/1987 | Lunsford et al. | 427/206 |
| 4,960,802 | 10/1990 | DiStefano | 521/149 |

FOREIGN PATENT DOCUMENTS

2135903 9/1984 United Kingdom .

*Primary Examiner*—John Kight, III
*Assistant Examiner*—John M. Cooney, Jr.
*Attorney, Agent, or Firm*—Michael Leach; James C. Simmons; William F. Marsh

[57] ABSTRACT

An aqueous contact adhesive composition comprising an aqueous adhesive copolymer emulsion, the adhesive composition having a durometer hardness measured on the type A scale by ASTM D2240 of at least 20, and a blowing agent. The aqueous contact adhesive composition is applied as a coating to a surface of each of two substrates, then foamed, and substantially dried to provide a dry cellular adhesive coating. The adhesive-coated surfaces are then joined. The preferred contact adhesive composition comprises a vinyl acetate/ethylene/N-methylolacrylamide copolymer emulsion.

14 Claims, No Drawings

CELLULAR CONTACT ADHESIVE FILMS HAVING IMPROVED BOND STRENGTH

This is a continuation of application Ser. No. 07/490,171 filed Mar. 8, 1990, now U.S. Pat. No. 4,960,802.

TECHNICAL FIELD

The present invention relates to aqueous contact adhesives and a method for bonding two substrates together using such contact adhesives.

BACKGROUND OF THE INVENTION

Contact adhesives differ from other adhesives, such as pressure sensitive adhesives, in that the adhesives are applied to both substrates to be joined and then dried. These adhesives are characterized by a bonding range or "open time", i.e., the period after the adhesive is dry during which adhesive coated substrates can be successfully joined and bonded. Contact adhesives are used to manufacture decorative laminates.

Environmental regulations require a reduction in solvent emissions in the decorative laminate industry. Solvent based neoprene contact adhesives, the industry standard, are a primary source of these emissions. Attempts have been made to reduce solvent volatiles through the use of aqueous contact adhesives. Such aqueous adhesives have been only marginally successful. Also, most of the aqueous adhesives do not provide the same bond strength as solvent-based systems.

U.S. Pat. No. 3,565,247 discloses a pressure sensitive adhesive tape, the adhesive layer of which is a foam.

U.S. Pat. No. 4,415,615 discloses a cellular pressure sensitive adhesive membrane comprising 15–85% voids that does not collapse after being briefly compressed. The adhesive product is preferably made by the steps of (1) frothing a composition which is polymerizable to a pressure sensitive adhesive state, (2) coating the froth onto a backing, and (3) polymerizing the coated froth in-situ to a pressure sensitive adhesive state.

GB 2,135,903 discloses a foamed pressure sensitive adhesive layer having a stable foam structure prepared by mixing a gas comprising oxygen with an aqueous dispersion comprising an unsaturated polyester, a pressure sensitive adhesive component and an accelerator comprising an organic compound effective for oxidative curing of the polyester. The formulations are preferably frothed with air.

U.S. Pat. No. 4,561,918 discloses foaming a vinyl acetate-ethylene copolymer based adhesive to extend the adhesive and thereafter applying it to the tips of the medium flutes subsequent to the corrugation of the medium. A liner is then applied to the glued medium to produce a single faced corrugated product.

U.S. Pat. No. 4,713,263 discloses a foamable, storage-stable flocking adhesive prepared from an aqueous emulsion of a vinyl acetate/ethylene/N-methylol co-monomer copolymer.

SUMMARY OF THE INVENTION

The present invention provides a water-based contact adhesive composition which demonstrates improved bond strength and comprises an aqueous medium containing an adhesive component, preferably having a durometer hardness measured on the type A scale by ASTM D2240 of at least 20, and a blowing agent. The durometer hardness value is determined from a dry film of the unfoamed adhesive component which comprises an emulsion polymer and all other additives of the contact adhesive excluding the blowing agent.

Another embodiment of the invention provides a method for laminating two substrates which comprises applying a coating of the water-based contact adhesive to a surface of each of the substrates, foaming the aqueous adhesive coatings, drying the foamed coatings to provide dry cellular adhesive coatings and joining the adhesive-coated surfaces of the substrates, preferably under application of pressure.

The invention allows the formulation of aqueous contact adhesives having bond strength superior to that obtained with such aqueous adhesives not having a cellular structure. It also allows aqueous contact adhesives to more closely approach the performance characteristics of solvent-based contact adhesives.

In one particular embodiment of the invention the contact adhesive comprises an aqueous vinyl acetate/ethylene/N-methylolacrylamide (VAE/NMA) copolymer emulsion with or without a blowing agent. The use of such emulsions as contact adhesives affords unexpectedly superior bond strength in the resulting laminated substrates.

The most preferred contact adhesive composition comprises a VAE/NMA copolymer emulsion, a blowing agent, colloidal silica and an acid catalyst. These contact adhesives provide bonds demonstrating improved high temperature resistance.

DETAILED DESCRIPTION OF THE INVENTION

The water-based contact adhesive compositions comprise an aqueous medium containing 30 to 80 wt % adhesive component, preferably having a durometer hardness greater than about 20, desirably greater than about 30. Any of a number of adhesive polymer emulsions well known in the art and based upon, for example, vinyl acetate-ethylene, acrylic, styrene-acrylic, styrene-butadiene or neoprene polymers may be used in the adhesive component of the cellular adhesive coating.

The preferred aqueous adhesive copolymer emulsion for use in the foamable contact adhesive composition is a vinyl acetate-ethylene (VAE) copolymer emulsion containing 40 to 65 wt % solids. The copolymer would comprise vinyl acetate, 5 to 40 wt %, preferably 15 to 30 wt %, ethylene and 0 to 10 wt % other copolymerizable monomers. Desirable contact adhesive compositions containing such VAE emulsions also contain up to 30 wt % plasticizer and may also contain 0-20 wt % phenolic or polyester thermosetting resin. Such VAE emulsions and contact adhesive compositions are disclosed in Application Ser. No. 07/382,828 filed Jul. 19, 1989 which is hereby incorporated by reference.

An especially preferred VAE copolymer emulsion is one in which the copolymer contains about 1–7 wt % copolymerized N-methylolacrylamide (NMA). Methods to prepare VAE/NMA copolymer emulsions are well known and U.S. Pat. Nos. 4,713,263 and 3,370,680 may be cited as illustrative. VAE/NMA copolymers having Tg's ranging from $-30°$ to $30°$ C., preferably $-16°$ to $+5°$ C., may be used. Foamed VAE/NMA contact adhesives are superior in strength to conventional aqueous neoprene adhesives. The most preferred foamable, aqueous contact adhesive comprises an adhesive component of a VAE/NMA copolymer emulsion, and 0-20 wt % plasticizer, 0.1-30 wt % colloidal silica, and 0-5 wt % acid catalyst, based on copolymer.

Most surprisingly, nonfoamable VAE/NMA contact adhesives (no blowing agent) yield greater bond strengths than comparable VAE's not containing NMA. Such nonfoamable aqueous contact adhesives would comprise VAE/NMA copolymer emulsion, and 0-20 wt % plasticizer and 0-5 wt % acid catalyst, based on copolymer.

As suitable plasticizers there may be used materials which a worker in the art may know as being a tackifier or a softening agent so long as it is the functional equivalent of a plasticizer for the purpose of this invention. Suitable plasticizers are of the usual type and well known to those in the art, namely, substantially nonviolatile solvents for the polymer and compatible therewith in the emulsion system. Examples of such plasticizers include dibutyl phthalate, ethyl butyl phthalate, butyl benzyl phthalate, aryl sulfonamides such as N-ethyl o and p-toluenesulfonamide, polymeric ester plasticizers, polyglycol ethers of phenols, such as nonylphenoxy poly(ethyleneoxy) ethanols and the like. Preferred amounts of plasticizer in the composition are 0-10 wt %.

Fillers of known utility such as clay, calcium carbonate, mica, feldspar, and the like are suitable.

Since acid catalysts accelerate the crosslinking of NMA, a suitable catalyst such as ammonium chloride, ammonium sulfamate, citric acid or salicylic acid should be used. In fact, almost any acid soluble in the aqueous or plasticizer phase may be used. Preferred amounts of acid catalyst in the composition are 0.5-2 wt %.

The cellular structure may be obtained by mechanically frothing the aqueous adhesive composition prior to coating, in which case the blowing agent is air, addition of a physical blowing agent such as, for example, a halocarbon or a hydrocarbon, or addition of a chemical blowing agent such as, for example, sulfonyl hydrazide. These blowing agents may be activated by evaporation at room temperature as in the case for the halocarbon or through thermal decomposition. For the purposes of this invention both the evaporation of the physical blowing agent and the thermal decomposition of the chemical blowing agent are considered as thermal activation.

The amount of blowing agent may be 1-30 wt % based on dry adhesive component, preferably 3-20 wt %. Illustrative of suitable chemical blowing agents would be the following thermally activated materials: sulfonyl hydrazides, diazoaminobenzene, azobis(isobutyronitrile), dinitroso pentamethylene tetramine, azodicarbonamide, sulfonyl semicarbazides, inorganic carbonates and inorganic bicarbonates. Also, room temperature activated blowing agents may involve the reaction of an acid on inorganic carbonate or bicarbonate or the catalytic decomposition of hydrogen peroxide or its reaction with a reducing agent. Suitable physical blowing agents would include pentane, trichlorofluoromethane, trichlorotrifluoroethane, and like materials having a heat of vaporization of <300 Joules/g, a swell index of <500% in the polymer, and a boiling point of <50° C.

The foamable contact adhesive compositions according to the invention may also contain other components like silica, foam nucleators and stabilizers such as surfactants, and thickeners.

The addition of colloidal silica to VAE/NMA emulsions in amounts ranging from 0.1 to 15 wt % (solids) provides a foamable aqueous contact adhesive having surprisingly improved high temperature resistance, particularly in the presence of acid catalyst. Suitable silica would be any free, non-aggregated particles having a smaller particle size than fumed silica or silica formed by other processes, such as colloidal silica marketed by DuPont under the trademark LUDOX AM.

The foamable contact adhesive composition can be applied to any substrate surface and will firmly bond such materials as leather, wood, metals, particle board, Formica and Wilsonart brand plastic laminates, fabrics, unglazed ceramics, wallboards and carpet to themselves and to each other.

A coating of the aqueous contact adhesive is applied to a surface of each of the substrates to be joined. The aqueous adhesive coatings are foamed by thermal activation of the blowing agent or the aqueous adhesive composition is foamed as it is applied using a foaming applicator as is well known in the art. The foamed coatings are then dried to provide dry cellular coatings and the adhesive-coated surfaces of the substrates are joined together, preferably under pressure.

The VAE/NMA-containing contact adhesives can be used on the above laminating process without the need of the foaming step.

In the following examples, the cellular contact adhesives were tested in a high pressure laminate (HPL) to particle board construction. Coat weights given in the Table are dry weight of adhesive per side. Lamination temperature refers to the temperature at which the two coated surfaces were mated. The peel test was performed across a bond length of 3 inches at a crosshead speed of 2 inch/min. The disc adhesion test was performed by cutting a 2.25 inch (4 in$^2$) disc through the HPL without damaging the particle board and bonding a steel disc to the surface of the HPL with epoxy. The HPL cutout is pulled in a tensile mode at 2 inch/min.

EXAMPLE 1

In this example, Airflex 465 vinyl acetate-ethylene copolymer emulsion was mixed with 4.8 parts by weight ammonium bicarbonate, based on the wet emulsion. This adhesive composition was applied to HPL and particle board surfaces with a paint roller at 4 g/ft$^2$ dry and then dried for 2 minutes at 300° F. The drying at elevated temperature caused the adhesive composition to foam and, upon drying, yield a cellular structure. The adhesive coated HPL and particle board surfaces were then laminated with a 30 pound roller.

TABLE 1

| Lamination Temp (°F.) | Peel Temp (°F.) | Edge Peel (pounds) | |
|---|---|---|---|
| | | A-465* | A-465 with 4.8 parts NH$_4$HCO$_3$ |
| 70° | 70° | 3 | 28 |
| 300° | 70° | 35 | 55 |
| 300° | 180° | 21 | 30 |

*Airflex 465 VAE copolymer emulsion (66% solids) available from Air Products and Chemicals, Inc.

It can be seen from the data in Table 1 that laminates prepared using the Airflex 465 copolymer emulsion containing the ammonium bicarbonate blowing agent provided surprisingly superior edge peel compared to laminates prepared using solely Airflex 465 copolymer emulsion.

EXAMPLE 2

In this example the base aqueous contact adhesive formulation used comprised 98 parts by weight Airflex 465 emulsion, one part Benzoflex 988 plasticizer and one part by weight Igepal CO 887 surfactant (plasticizer). The base formulation was compared to the same formulation containing 4.8 parts by weight ammonium bicarbonate blowing agent. Laminates were prepared by applying the adhesive compositions with an air spray gun to particle board and HPL at 4 g/ft$^2$ dry. The substrates were then dried for 2 minutes at 300° F. and laminated with a 30 pound roller at 300° F.

TABLE 2

| Viscosity (cps) | Peel Temp (°F.) | Edge Peel (pounds) w/o Blowing Agent | w/4.8 parts NH$_4$HCO$_3$ |
| --- | --- | --- | --- |
| 200 | 70° | 34 | 61 |
| 200 | 180° | 11 | 25 |
| 1300 | 70° | 0 | 25 |

Again it can be seen that the addition of ammonium bicarbonate as a chemical blowing agent to the base adhesive composition resulted in a marked improvement in the edge peel values. The adhesive compositions having a viscosity of 1300 cps were achieved through the addition of a thickener.

EXAMPLE 3

The same base aqueous adhesive composition used in Example 2 was used with and without ammonium bicarbonate blowing agent to prepare particle board laminates which were tested for edge peel strength and water resistance by a 24 hour water soak. The laminates were prepared by the same procedure of Example 2.

TABLE 3

| Peel Temp (°F.) | Edge Peel (pounds) w/o Blowing Agent | w/4.8 parts NH$_4$HCO$_3$ | 24 HR Water Soak w/o Blowing Agent | w/4.8 parts NH$_4$HCO$_3$ |
| --- | --- | --- | --- | --- |
| 70° | 40 | 55 | poor-fair bond, severe edge lift | fair-good bond, very slight edge lift |
| 180° | 18 | 27 | | |

Not only did the adhesive composition containing the blowing agent provide improved edge peel strength at both peel temperatures, it also provided a laminate that demonstrated improved water resistance.

EXAMPLE 4

In this example the same base contact adhesive formulation of Example 2 with and without ammonium bicarbonate blowing agent was used to prepare commercial countertops for evaluation on a Midwest Automation post-forming unit under conditions standard in the industry. The base contact adhesive composition without the blowing agent was applied at greater than 5 g/ft$^2$ whereas the adhesive composition containing the blowing agent was applied in an amount of 4 g/ft$^2$.

TABLE 4

| | Ct. Wt (g/ft$^2$) | Disc Adhesion, lbs (% Fiber Tear) Front | Middle | Back |
| --- | --- | --- | --- | --- |
| w/o Blowing Agent | >5 | 205(0) | 85(0) | 245(0) |
| w/4.8 parts NH$_4$HCO$_3$ | 4 | 570(100) | 180(5) | 345(10) |

It can be seen from the data in Table 4 that the use of a thermally activated blowing agent to provide a contact adhesive composition having a cellular structure resulted in the laminate having dramatically improved adhesion properties as demonstrated by the disk adhesion test on samples from the front, middle and back of the laminate.

EXAMPLE 5

In this example an aqueous contact adhesive composition based on Airflex 129 emulsion was compared in a commercial countertop trial using a Midwest Automation post-forming unit with a solvent-based neoprene adhesive. The following aqueous-based adhesive composition containing a blowing agent was prepared:

| | |
| --- | --- |
| A-129$^a$ | 100 g |
| Benzoflex 988 | 10 g |
| NH$_4$HCO$_3$ | 4.8 g |
| Viscalex AT66$^b$ | 0.17 g |

$^a$Airflex 129 VAE/(4.8%) NMA copolymer emulsion (52% solids) available from Air Products and Chemicals, Inc. Tg = −16° C.
$^b$Thickener available from Allied Colloids, Inc.

TABLE 5

| Adhesive | Ct. Wt. (g/ft$^2$) | Disc Adhesion, pounds (% Fiber Tear) Front | Middle | Back | Backsplash |
| --- | --- | --- | --- | --- | --- |
| Aqueous A-129 | 2.0 | 450(40) | 240(5) | 520(15) | 450(20) |
| | 2.0 | 450(30) | 150(5) | 290(5) | 270(5) |
| | 2.0 | 480(80) | 270(10) | 350(10) | 360(10) |
| Solvent Neoprene | 1.5 | 340(5) | 370(10) | 450(20) | 270(5) |
| | 1.5 | 410(10) | 380(5) | 280(5) | 420(10) |

The data in Table 5 shows that the aqueous Airflex 129 contact adhesive composition upon foaming and subsequent drying provided laminates that were substantially equivalent in performance in the disk adhesion test to laminates prepared using the industry standard solvent-based neoprene contact adhesive.

EXAMPLE 6

In this example Compositions 1 and 2 as shown in Table 6 were prepared using Freon 11 (trichlorofluoromethane) as the blowing agent and evaluated in an HPL to particle board laminate prepared according to the procedure in Example 1. Compositions 3 and 4 were the same as 1 and 2, respectively, but without a blowing agent. The adhesive was dried one hour at room temperature and laminated at room temperature.

TABLE 6

| Comp | 1 | 2 | 3 | 4 |
|---|---|---|---|---|
| A-465 | 100 | — | 100 | — |
| A-129 | — | 100 | — | 100 |
| Benzoflex 988 | 10 | 10 | 10 | 10 |
| KCS Clay | 10 | 10 | 10 | 10 |
| Freon 11 | 10 | 10 | — | — |
| 70° F. Edge Peel (lbs) | 36 | 38 | 9 | 14 |

Compositions 1 and 2 which contained the Freon 11 blowing agent to provide a cellular adhesive structure upon drying gave vastly improved edge peel performance compared to the same adhesive compositions which do not generate a cellular structure upon drying.

EXAMPLE 7

In this example commercially available aqueous neoprene contact adhesives, Fastbond 30 and Swift 45656 were evaluated with Freon 11 blowing agent under conditions described in Example 6.

TABLE 7

| | Edge Peel (lb) |
|---|---|
| Fastbond 30 | 40 |
| Fastbond 30 + 10 parts Freon 11 | 58 |
| Swift 45656 | 40 |
| Swift 45656 + 10 parts Freon 11 | 62 |

The addition of a blowing agent to the aqueous neoprene contact adhesives provide a laminate of HPL and particle board demonstrating surprisingly improved peel strength.

EXAMPLE 8

Two VAE/NMA copolymer emulsions (Airflex 129 and Airflex 109) were blended with a plasticizer and ammonium bicarbonate blowing agent to provide foamable contact adhesives and compared to solvent-based and water-based neoprene contact adhesives in hot lamination. The laminate samples were roll coated at 4 g/ft$^2$, dried as shown in Table 8 and laminated hot directly out of the oven at the temperature indicated using a 30 lb roller. The samples were cooled prior to testing.

TABLE 8

| Adhesive (wet parts) | | Drying Conditions | Edge Peel (lb) | Disc Adh (lb) | Durometer Hardness |
|---|---|---|---|---|---|
| Airflex 129 | (100) | 2 min 302° F. | 98 | 590 | 25 |
| Benzoflex 988 | (10) | 4 min 176° F. | 86 | | |
| NH$_4$HCO$_3$ | (4.8) | | | | |
| Airflex 109 | (100) | 2 min 302° F. | 98 | 610 | — |
| Plasthall BSA | (3) | 4 min 176° F. | 87 | | |
| Aquatac 6085 | (5) | | | | |
| NH$_4$HCO$_3$ | (4.8) | | | | |
| Aqueous-based Neoprene | | 2 min 302° F. | 75 | 310 | 47 |
| | | 4 min 176° F. | 69 | | |
| Solvent-base Neoprene | | 2 min 302° F. | 62 | 480 | — |
| | | 4 min 176° F. | 40 | | |

The laminates made using the two foamed VAE/NMA-containing contact adhesives demonstrated significantly superior edge peel strength and disc adhesion compared to the two neoprene contact adhesives.

EXAMPLE 9

This example demonstrates the unexpected improvement in high temperature resistance of the laminate provided by the addition of silica to a foamable aqueous VAE/NMA contact adhesive. The two aqueous contact adhesive formulatives contained Freon 113 (trichlorotrifluoroethane) as the blowing agent. The laminate samples were brush coated at 4 g/ft$^2$, dried one hour at 70° F. and then laminated at 70° F. using a 30 lb roller.

TABLE 9

| | A | B |
|---|---|---|
| Airflex 109[a] | 100 | 100 |
| Plasthall BSA | 10 | 10 |
| Igepal CO630 | 2 | 0.5 |
| Iegpal CO987 | 2 | — |
| ASP 400 Clay | — | 5 |
| Ludox AM Silica[b] | — | 25 |
| Freon 113 | 8 | 8 |
| NH$_4$Cl | — | 0.5 |

[a]VAE/(4.8%) NMA copolymer emulsion available from Air Products and Chemicals, Inc. 52% solids, Tg = 0°C.
[b]Colloidal silica from DuPont.

| Adhesive | Disc Adhesion (lbs) | Edge Peel (lbs) | Shear Failure Temperature °F. | | Peel Failure Temperature °F. | |
|---|---|---|---|---|---|---|
| | | | Initial | 1 week | Initial | 1 week |
| A | 430 | 40 | 190 | 199 | 178 | 180 |
| B | — | 66 | >302 | >302 | 257 | >284 |
| Aqueous Neoprene | 230 | 43 | >302 | >302 | 228 | 257 |

Table 9 shows that the sheer failure temperature and peel failure temperature for the laminate using the silica-containing contact adhesive B were greatly improved over adhesive A and comparable to aqueous neoprene adhesive.

EXAMPLE 10

This example demonstrates that the incorporation of NMA as a comonomer into in a VAE copolymer provides a foamable aqueous contact adhesive composition having vastly improved edge peel. The two contact adhesive compositions A and B contained ammonium bicarbonate as the blowing agent. The laminates were prepared by coating the HPL and the particle board with a paint brush. The adhesive coatings were foamed and dried using a hot air gun and cooled to room temperature. The substrates were then laminated using a 30 lb roller.

TABLE 10

| Adhesive | A[a] | B[a] |
|---|---|---|
| Airflex 465 | 89 | — |
| Airflex 129 | — | 91 |
| Benzoflex 988 | 10 | 9 |
| Igepal CO 887 | 1 | — |

TABLE 10-continued

| Adhesive | A[a] | B[a] |
|---|---|---|
| NH$_4$HCO$_3$ | 4.8 | 4.8 |

[a] wet weights

| Adhesive | Coating Wt. (dry g/ft$^2$) | 70° F. Edge Peel (lb.) |
|---|---|---|
| A | 2.1 | 13 |
|   | 2.5 | 10 |
|   | 3.1 | 20 |
|   | 4.0 | 38 |
| B | 2.1 | 28 |
|   | 2.6 | 30 |
|   | 3.0 | 46 |
|   | 4.1 | 56 |

It can be seen from the data in Table 10 that the VAE/NMA copolymer emulsion-containing contact adhesive B provided laminates with surprisingly superior edge peel strength compared to laminates made with contact adhesive A at approximately equal coat weights.

EXAMPLE 11

This example also demonstrates the surprising improvement in high temperature resistance of a laminate resulting from the addition of colloidal silica to an acid catalyzed, foamable, aqueous VAE/NMA contact adhesive. The compositions of adhesives A–F are shown in Table 11 in parts by weight, wet.

The HPL to particle board laminate samples were brush coated at 4 g/ft$^2$, dried for one hour at 70° F. and then laminated at 70° F. The edge peel failure test was performed across a 3 inch wide laminate starting at 68° F. and rising 18° F./10 min. The shear test was performed at 302° F. on a one square inch sample with a 1 kg weight.

TABLE 11

| Adhesive | A | B | C | D | E | F |
|---|---|---|---|---|---|---|
| Airflex 109 | 100 | 100 | 100 | 100 | — | — |
| Airflex 465 | — | — | — | — | 100 | 100 |
| Colloidal Silica | — | — | 25 | 25 | — | 25 |
| Plasticizer | 10 | 10 | 10 | 10 | 10 | 10 |
| Salicylic Acid | — | 0.5 | — | 0.5 | — | — |
| Freon 113 | 10 | 10 | 10 | 10 | 10 | 10 |
| Peel Failure Temperature (°F.) | 273 | 293 | 290 | >392 | 270 | 243 |
| Shear Resistance At 302° F. (hrs) | 0.1 | 0.1 | >22 | >22 | — | — |
| Durometer | — | 30 | 65 | 64 | 35 | — |

Including colloidal silica in a plasticized, foamable aqueous VAE/NMA adhesive containing acid catalyst (Adhesive D) resulted in a marked increase in peel failure temperature and high temperature shear resistance. The addition of colloidal silica without an acid catalyst (Adhesive C), although still giving improved high temperature shear resistance relative to adhesives without colloidal silica (Adhesives A and B), did not show the superior peel failure temperature performance of Adhesive D. Adding colloidal silica to a plasticized aqueous VAE adhesive did not afford such improvements, and in fact, the peel failure temperature decreased.

EXAMPLE 12

This example shows that a VAE/MNA copolymer emulsion can be used as a unfoamed aqueous contact adhesive to prepare laminates having surprisingly good bond strength.

Airflex 129 VAE/NMA emulsion and Airflex 465 VAE emulsion, both neat and plasticized, were roll coated onto HPL and particle board at 4 g/ft$^2$ dry weight. The substrates were dried for 2 min. at 302° F. and joined together at the indicated temperature.

TABLE 12

| Adhesive | Laminated 302° F. | | | Laminated At 70° F. |
|---|---|---|---|---|
|  | 70° F. Peel | 180° F. Peel | 24 hrs. Soak | 70° F. Peel |
| Airflex 129 adj. to 1300 cps | 52 | 24 | — | 30 |
| Airflex 465 1450 cps | 39 | 22 | — | 5 |
| Airflex 129 (100)[a] Benzoflex 988 (10) | 72, 70 | 19, 19 | no edge lift excellent bond | 40, 41 |
| Airflex 129 (100) Benzoflex 988 (5) | 67, 63 | 20, 19 | — | 32, 40 |
| Airflex 465 (98) Benzoflex 988 (10) Igepal CO 887 (1) | 41, 46 | 21, 19 | severe edge lift, poor bond | 4, 9 |

[a] part by weight, wet

Both the plasticized and unplasticized nonfoamable aqueous VAE/NMA adhesives, compared to their VAE counterparts, showed improved 70° F. peel while the 180° F. peels were comparable for laminates made at 302° F. The plasticized VAE/NMA adhesive provided a 302° F. laminate showing excellent water resistance compared to the VAE version. For laminates made at 70° F. the VAE/NMA containing adhesives were vastly superior in 70° F. peel.

The present invention allows the formulation of aqueous contact adhesives with improved bond strength. This is achieved by taking advantage of higher modulus polymers which normally do not form a good contact bond due to their poor flow characteristics and foaming the aqueous emulsions of the polymers. The cellular structure makes even a high modulus adhesive film more deformable and enhances the formation of a contact bond.

STATEMENT OF INDUSTRIAL APPLICATION

The present invention provides improved aqueous-based contact adhesive compositions and a method for making laminates having improved bond strength.

I claim:

1. In an aqueous contact adhesive composition comprising an aqueous polymer emulsion, the improvement which comprises an adhesive component, which consists essentially of an emulsion polymer having a durometer hardness measured on the type A scale by ASTM D 2240 of at least 20, and 1-30 wt % (based on dry adhesive component) of a thermally activated physical blowing agent having a heat of vaporization of <300 Joules/q, a swell index of <500% in the polymer, and a boiling point of <50° C.

2. The adhesive composition of claim 1 in which the polymer is a vinyl acetate-ethylene, acrylic, styrene-acrylic, styrene-butadiene or neoprene polymer.

3. The adhesive composition of claim 1 in which the polymer is a vinyl acetate-ethylene copolymer.

4. The adhesive composition of claim 1 in which the adhesive component has a durometer hardness of at least 30.

5. The adhesive composition of claim 1 in which the blowing agent is ammonium bicarbonate, trichlorofluoromethane or trichlorotrifluoroethane.

6. The adhesive composition of claim 3 which also contains up to 30 wt % plasticizer.

7. In an aqueous contact adhesive composition comprising an aqueous polymer emulsion, the improvement which comprises an adhesive consisting essentially of a vinyl acetate-ethylene copolymer which is 5 to 40 wt % ethylene and 0-10 wt % other copolymerizable monomers, the adhesive component having a durometer hardness measured on the type A scale by ASTM D2240 of at least 20, and 1-30 wt %, based on dry adhesive component, of a thermally activated physical blowing agent having a heat of vaporization of <300 Joules/g, a swell index of <500% in the polymer, and a boiling point of <50° C.

8. The adhesive composition of claim 7 in which the blowing agent is a material having a heat of vaporization of <300 Joules/g, a swell index of <500% in the polymer and a boiling point of <50° C.

9. The adhesive composition of claim 7 in which the copolymer contains 1-7 wt % N-methylolacrylamide and has a Tg of −30° to +30° C.

10. The adhesive composition of claim 9 which also contains 0-20 wt % plasticizer and 0-5 wt % acid catalyst.

11. The adhesive composition of claim 7 in which the blowing agent is trichlorofluoromethane or trichlorofluoroethane.

12. The adhesive composition of claim 7 in which the blowing agent is ammonium bicarbonate.

13. The adhesive composition of claim 10 in which the blowing agent is trichlorofluoromethane or trichlorofluoroethane.

14. The adhesive composition of claim 10 in which the blowing agent is ammonium bicarbonate.

* * * * *